(12) United States Patent
Headley et al.

(10) Patent No.: US 6,778,075 B2
(45) Date of Patent: Aug. 17, 2004

(54) TIRE INFLATION MONITORING SYSTEM

(75) Inventors: Philip Mark Headley, Brighton, MI (US); Vinh Huu Tran, Farmington Hills, MI (US)

(73) Assignee: Continental Teves, AG & Co., OHG, Frankfurt (DE)

( * ) Notice: Subject to any disclaimer, the term of this patent is extended or adjusted under 35 U.S.C. 154(b) by 39 days.

(21) Appl. No.: 10/135,804

(22) Filed: Apr. 30, 2002

(65) Prior Publication Data

US 2003/0201881 A1 Oct. 30, 2003

(51) Int. Cl.[7] .............................................. B60C 23/00
(52) U.S. Cl. ...................... 340/443; 340/442; 340/445; 340/447; 73/146.5
(58) Field of Search ................................ 340/443, 442, 340/438, 444, 445, 446, 447; 73/146, 146.5

(56) References Cited

U.S. PATENT DOCUMENTS

| | | | | |
|---|---|---|---|---|
| 4,117,452 A | * | 9/1978 | Snyder et al. | 340/442 |
| 4,196,414 A | * | 4/1980 | Muller | 340/442 |
| 4,476,455 A | * | 10/1984 | Kawakami | 340/442 |
| 4,717,905 A | * | 1/1988 | Morrison, Jr. et al. | 340/442 |
| 6,259,361 B1 | | 7/2001 | Robillard et al. | 340/447 |
| 6,278,363 B1 | | 8/2001 | Bezek et al. | 340/442 |
| 6,448,891 B2 | * | 9/2002 | Barnett | 340/438 |

FOREIGN PATENT DOCUMENTS

| | | |
|---|---|---|
| FR | 93 10847 | 3/1995 |
| WO | WO 01/11330 | 2/2001 |

* cited by examiner

*Primary Examiner*—Toan N. Pham

(57) ABSTRACT

A system for monitoring the inflation status of a tire comprising a sensor mounted to the wheel rim and adapted to transmit a distance signal indicative of a measured distance from the wheel rim to the inside surface of the tire adjacent the riding surface; a control unit in communication with the sensor and adapted to receive the distance signal, wherein the control unit determines the inflation status of the tire and transmits an inflation status signal indicative of the inflation status; and an indicator located within the passenger compartment of the vehicle and in communication with the control unit to receive the inflation status signal, wherein the indicator presents the inflation status of the tire.

17 Claims, 4 Drawing Sheets

TIRE INFLATION MONITORING SYSTEM

TECHNICAL FIELD

The present invention relates generally to tire inflation monitoring systems and, more specifically, to tire inflation monitoring systems that determine the inflation of a tire by measuring deflection of the tire.

BACKGROUND

Tire inflation monitoring systems are attractive features for vehicles because they help vehicle operators become aware of improperly inflated tires. Operating a vehicle with improperly inflated tires tends to decrease gas mileage and increase tire wear, which results in reduced tire life. These drawbacks may be obviated by alerting a driver of the vehicle that tire inflation is outside a normal range. Therefore, there is a demand for tire inflation monitoring systems in the automotive industry as well as other industries.

While tire pressure monitors exist at the present time, the pressure readings may be misleading. A tire pressure reading alone does not serve to alert the driver whether the tire pressure is adequate for the present driving condition of the vehicle. Several factors must be considered when determining whether tire inflation is appropriate.

A parameter that ought to be considered is a load of the vehicle. As tire pressure decreases, the load capacity of the tire decreases. Similarly, load capacity decreases as tire pressure increases. Currently available tire pressure monitors do not take load of the vehicle into account. Therefore, by neglecting to consider the load of the vehicle, present day technology may not accurately assess tire inflation status. Other parameters that affect the integrity of tire structure are air temperature within the tire and rotational speed of the tires. Neglecting to consider these parameters may lead to misleading tire pressure readings and premature tire wear.

In light of the concerns discussed above, a tire inflation monitoring system capable of considering multiple vehicle parameters in its assessment of tire inflation is needed. Moreover, a new and improved tire inflation monitoring system that may aid a vehicle operator in determining the life of a tire would be desirable.

DETAILED DESCRIPTION

The following description of the preferred embodiment of the invention and the preferred method of using the invention are not intended to limit the scope of this invention to this preferred embodiment and method, but rather to enable any person skilled in the art of tire inflation monitoring systems to make and use the invention.

Figure 1:
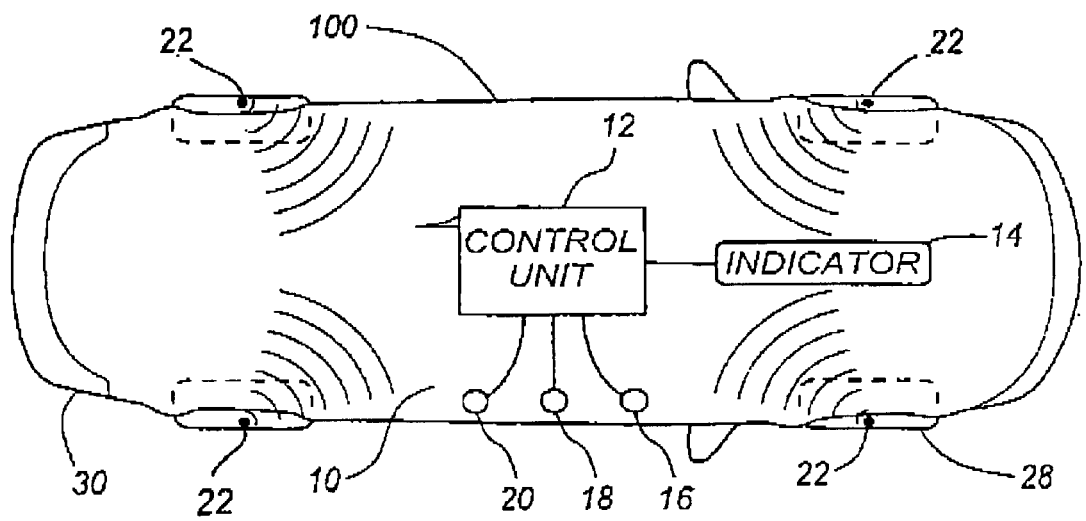
FIG. 1 is a top schematic view of a tire inflation monitoring system shown in accordance with the present invention.

A preferred embodiment of a tire inflation monitoring system 10 is illustrated in FIG. 1, in accordance with the present invention. System 10 is mounted in a road vehicle 30. System 10 includes a distance or proximity sensor 22, a control unit 12, an indicator 14, and a wheel assembly 28. A function of system 10 is to measure a vehicle parameter, determine a tire inflation status based on that parameter, and display the tire inflation status. In a preferred embodiment of the present invention, the vehicle parameter is a distance or proximity measurement. More particularly, control unit 12 receives a distance or proximity signal indicative of a distance measurement from distance sensor 22. Controller 12 then determines the tire inflation status based on the distance measurements and transmits an inflation status of a tire signal indicative of the inflation status to indicator 14. Indicator 14 may then display the tire inflation status.

Figure 3A:
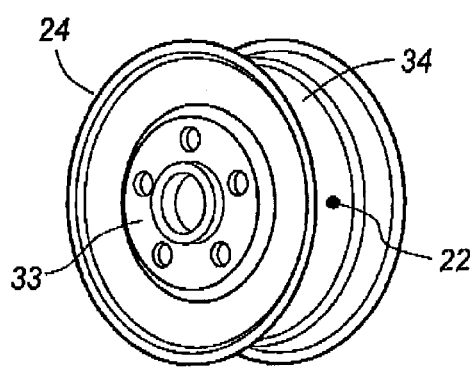
FIG. 3A is a side perspective view of a wheel equipped with a sensor for monitoring tire inflation in accordance with the present invention.
Figure 3B:
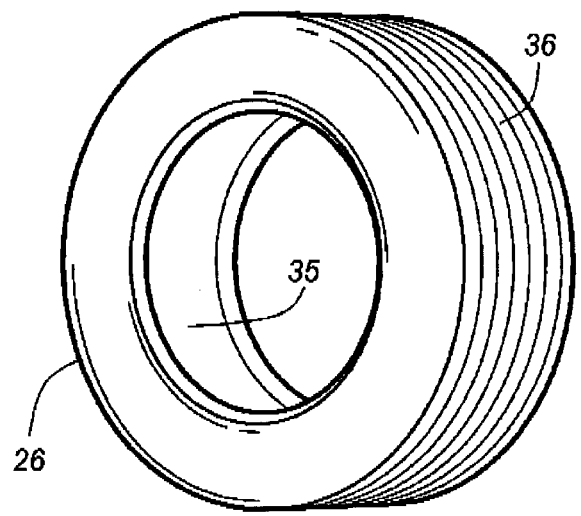
FIG. 3B is a side perspective view of a tire showing a riding surface of the tire.

The purpose of distance sensor 22 is to measure a distance between wheel rim 34 (shown in FIG. 3A) and an interior surface of tire 26 opposite a riding surface 36 (shown in FIG. 3B). Distance sensor 22 is preferably a proximity sensor. More particularly, distance sensor 22 is preferably an optical sensor that transmits optical waves toward the interior surface of tire 26 and then receives the optical waves reflected from the interior surface of the tire. In an alternative embodiment, distance sensor 22 is an ultrasonic sensor that transmits ultrasonic waves toward the interior surface of tire 26 and then receives the ultrasonic waves reflected from the interior surface of the tire. In both embodiments discussed above, the distance between wheel rim 34 and interior surface of tire 26 is a function of the time it takes the transmitted signal to be reflected and then received by sensor 22. Alternatively, any other suitable device capable of measuring distance between wheel rim 34 and the interior wall of tire 26 may be used.

Preferably, distance sensor 22 is in communication with control unit 12 by wireless means such as through radio frequency (RF) transmissions. In an embodiment of the present invention, distance sensor 22 would be connected to a transmitter or transceiver for communicating with controller 12. This sensor and transmitter or transceiver arrangement would be similar to conventional tire monitoring systems having a pressure sensor instead of a distance sensor. Alternatively, any suitable connection capable of transmitting and receiving wireless signals between those devices may be used. In a further embodiment of the present invention, distance sensor 22 includes a controller with logic for pre-processing the distance signal. This embodiment reduces the bandwidth requirement of the RF transmissions between distance sensor 22 and control unit 12. The controller is preferably a conventional processor. However, any suitable device capable of pre-processing the distance signal may be used.

Control unit 12 determines an inflation status using information or data contained within the signals transmitted by distance sensor 22. Generally, control unit 12 includes control logic for determining the inflator status of tire 26 and for controlling the display of the status on indicator 14. This control logic may be carried out in software or hardware, such as executable code and/or logic devices. Further, control unit 12 may include or is in communication with various memory devices, such as RAM, ROM, and/or non-volatile memory.

The inflation status is a representation of a generalized level of inflation of tire 26. In the preferred embodiment, there are three categories of inflation status: normal, low, and high. Alternatively, any suitable categorization may be used. Control unit 12 is adapted to receive signals transmitted from distance sensor 22. Upon receiving signals from distance sensor 22, control unit 12 determines the inflation status that correlates with the measured distance.

Control unit 12 preferably determines the inflation status by using a look-up table stored in a memory (not shown) of control unit 12. The look-up table correlates inflation status with distance from wheel rim to interior surface of the tire. Alternatively, any other suitable method of determining the inflation status as a function of distance may be used. For example, control unit 12 may calculate a level of inflation using distance as a variable and subsequently determine the inflation status using the calculated inflation level.

Control unit 12 is preferably connected to and is capable of communicating inflation status signals to indicator 14. Electrical wiring preferably connects control unit 12 and indicator 14. However, any suitable connection capable of transmitting signals between these devices may be used, such as an RF communication. Furthermore, control unit 12 may be integrated with a control unit used for unrelated operations of the vehicle. For example, in one embodiment, control unit 12 is integrated with a control unit concurrently used for controlling an anti-lock braking system of the vehicle.

Figure 4:
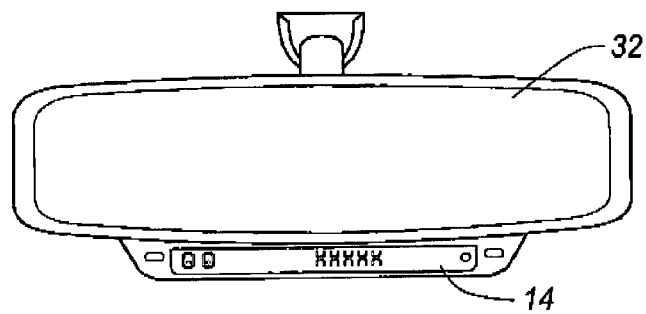
FIG. 4 is a front view of a rear view mirror equipped with an indicator display.

The purpose of indicator 14 is to notify an occupant of vehicle 30 of the inflation status of tire 26. Indicator 14 is preferably a visual device located within a passenger compartment (not shown) of vehicle 30 that adequately attracts the attention of the driver. More particularly, as shown in FIG. 4, indicator 14 is preferably a visual device located within a rear view mirror assembly 32 of vehicle 30. Alternatively, indicator 14 may be an audio device, a device using both audio and visual means, or any other suitable device capable of notifying an occupant of the inflation status of tire 26.

Figure 2:
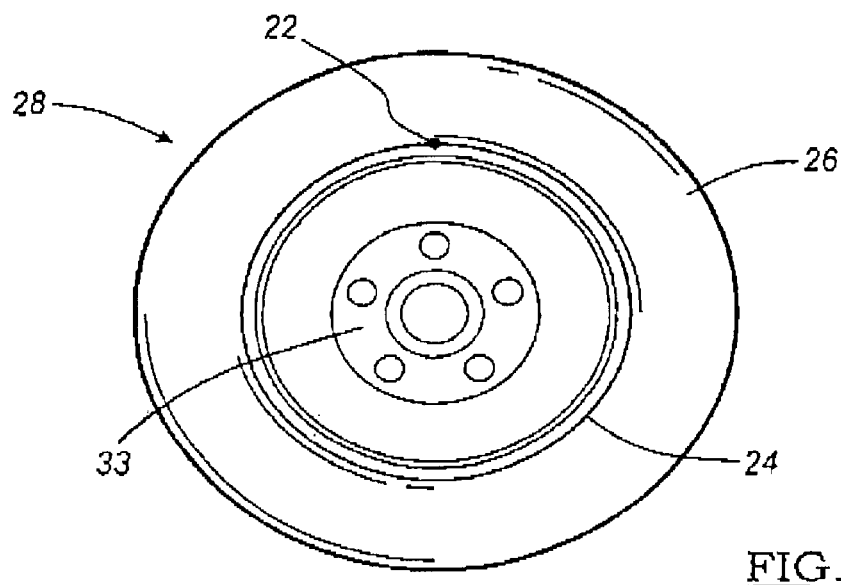
FIG. 2 is a side view of a wheel equipped with a sensor for monitoring tire inflation.
Figure 5:
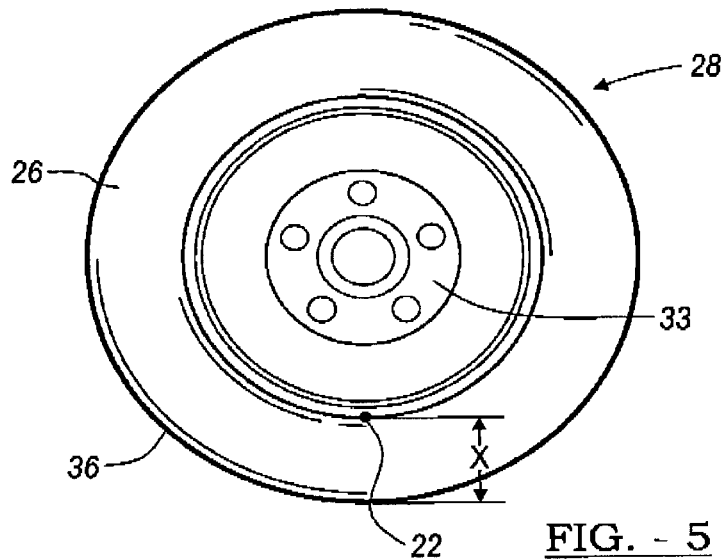
FIG. 5 is a side view of a wheel equipped with a sensor and a distance "x" measured between a wheel rim and an interior wall of the tire adjacent the riding surface.

Wheel assembly 28, as shown in FIG. 2, includes wheel 24 and tire 26. Further, as shown in FIG. 3A, wheel 24 includes wheel base 33 and wheel rim 34. Distance sensor 22 is preferably located at a centralized position on wheel rim 34. As shown in FIG. 3B, riding surface 36 is located along a perimeter of tire 26. As shown in FIG. 5, distance sensor 22 measures a distance "X" between wheel rim 34 and the interior wall of tire 26 opposite riding surface 36. While vehicle 30 is in operation (stationary or moving), distance sensor 22 periodically measures distance and transmits signals indicative of those measurements to control unit 12. The inflation status may be derived using the measurements of the distance between wheel rim 34 and the interior surface 35 of tire 26 opposite riding surface 36.

Figure 6:
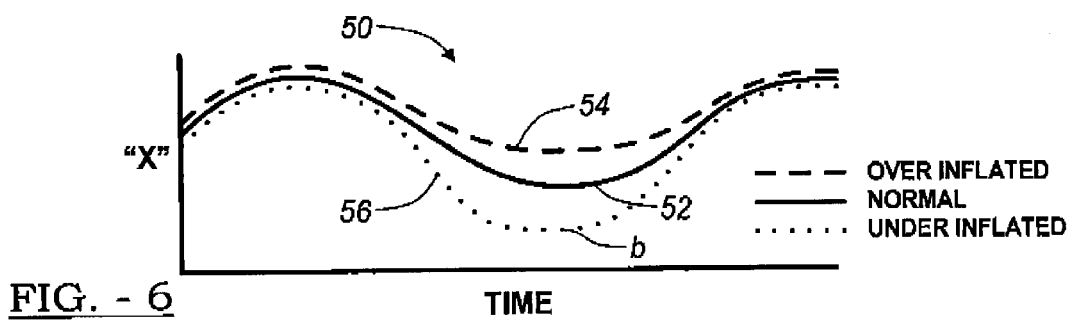
FIG. 6 is a graph of measurements of distance "x" over time.

A graph 50 of distance "X" measurements over time as wheel assembly 28 rotates on a surface results in an approximated sine wave curve, as shown in FIG. 6. Three curves are shown, and represent three separate conditions of tire 26: curve 52 represents a normally inflated tire, curve 54 represents an over-inflated tire and curve 56 represents an under-inflated tire. As shown, at a point B on curve 56 distance sensor 22 is closest to a ground surface. An under-inflated tire will produce curve 56 that is shifted below curve 52 of a normally inflated tire, while an over-inflated tire will produce curve 54 that is shifted above the curve of a normally inflated tire. While in use, the system of the present invention compares distance "x" measurements to theoretical curves representing over-inflation and under-inflation thresholds to determine whether tire 26 is over-inflated, under-inflated, or normally inflated.

Figure 7:
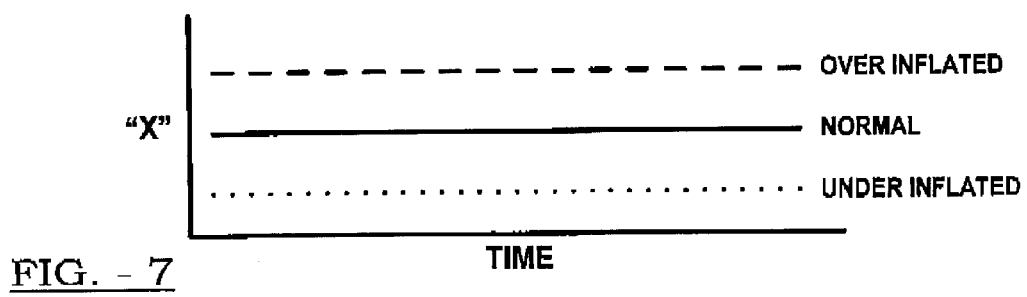
FIG. 7 is a graph of a pre-processed distance signal.

As an alternative to comparing distance "x" to sine wave curves, the distance "x" measured signal may be pre-processed to represent a horizontal line that has been filtered with a desired offset as shown in FIG. 7. The pre-processed distance "x" signal may be compared to horizontal lines representing an over-inflation threshold and an under-inflation threshold to determine the inflation level status of tire 26.

Although the previous embodiment accounts for external effects on the deflection of the tire, such as vehicle load, tire temperature, vehicle speed, etc., an alternative embodiment of the present invention utilizes additional vehicle parameters in conjunction with distance measurements to determine the inflation status of tire 26. By measuring additional parameters, a more precise inflation status reading may be achieved. In one embodiment, a temperature sensor 16, a velocity sensor 18, and a load sensor 20 are used in addition to distance sensor 22. In this embodiment, the inflation status is a function of distance, temperature, velocity, and load. Alternatively, the inflation status may be determined as a function of distance and any of the aforementioned vehicle parameters.

Temperature sensor 16 functions to measure an air temperature within tire 26, velocity sensor 18 functions to measure a velocity of vehicle 30 relative to a ground surface, load sensor 20 functions to measure a load of vehicle 30. Temperature sensor 16, velocity sensor 18, and load sensor 20 are preferably conventional sensors. However, any suitable device capable of measuring the parameters discussed above may be used. Temperature sensor 16, velocity sensor 18, and load sensor 20 are preferably connected to and are capable of communicating temperature signals, velocity signals, and load signals, respectively, to control unit 12. Upon receiving these signals, control unit 12 determines the inflation status in a similar manner as described above. Preferably, sensors 16, 18, 20 are connected to control unit 12 by electrical wiring. Alternatively, any suitable connection may be used, such as an RF communication.

Figure 8:
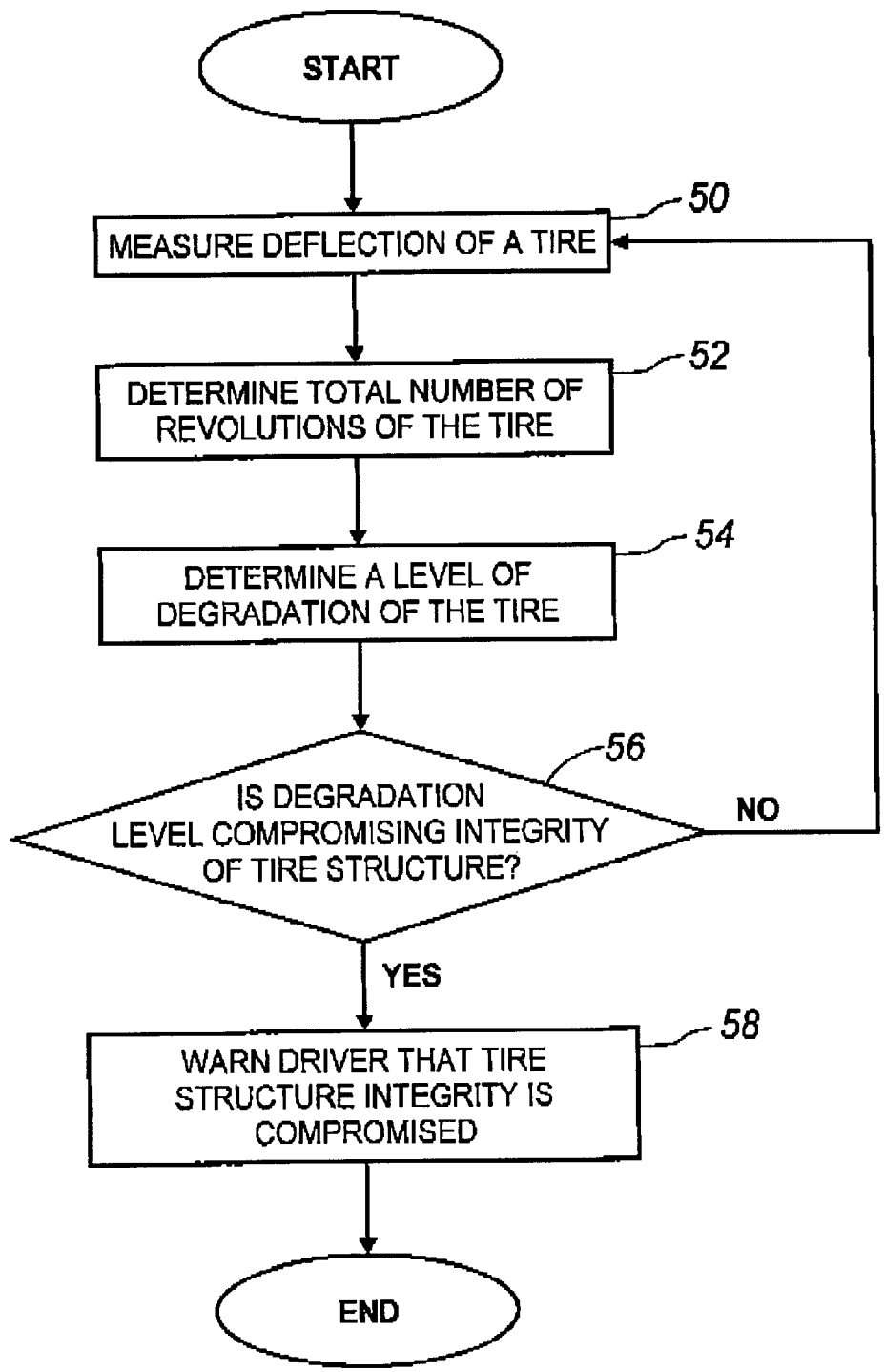
FIG. 8 is a flow chart of a method for determining degradation of a tire.

FIG. 8 shows a method that may be used to determine degradation of a tire. At block 50, the deflection of a tire is measured. This measurement may be performed by a distance sensor in accordance with the description above. Alternatively, any other device for measuring the required distance may be used.

At block 52, the total number of revolutions of the tire is determined. This may be done directly by using a counter which is able to count and store the number of revolutions of the tire. Alternatively, this determination can be achieved by using a sensor capable of measuring the rotational speed directly or by converting velocity measurements of the vehicle into rotational speed of the tire. The total number of revolutions may be computed as a function of time and velocity of the vehicle or time and rotational speed of the tire. This computation may be performed by a control unit as described above or any other suitable device. It should be appreciated that any suitable method capable of determining the total number of revolution of the tire may be used.

At block 54 a level of degradation of tire 26 is determined. A control unit preferably determines the level of degradation by accessing a look-up table in which level of degradation is correlated with the total number of revolutions and the magnitude of deflections determined to be outside the normal range. Alternatively, any suitable method capable of determining the level of degradation may be used.

At block 56 it is determined whether the level of degradation compromises the integrity of tire structure. If it is determined that the integrity of tire structure is compromised, then the driver is warned (block 58). The driver is preferably warned by displaying an image or audio sound within the passenger compartment of the vehicle. Alternatively, any suitable method of notifying the driver may be used. If it is determined that the integrity of tire structure is acceptable, the process is repeated.

In a further embodiment, the above method of determining a level of tire degradation may use additional vehicle parameters to achieve a more precise result. The level of degradation may be determined as a function of total number of revolutions of tire 26, magnitude of deflection, temperature within tire 26, and load of vehicle 30, or any combination of the aforementioned parameters. Temperature and load may be measured using temperature sensor 16 and load sensor 20, respectively, as discussed above. Alternatively, any suitable device for measuring temperature and load may be used. The level of degradation is preferably determined by control unit 12, which preferably uses a look-up table to determine the degradation level as a function of total number of revolutions, magnitude of flex, temperature within tire 26, and load of vehicle 30.

As any person skilled in the art of steer-by-wire systems will recognize from the previous detailed description and from the figures and claims, modifications and changes can be made to the preferred embodiment of the invention without departing from the scope of this invention defined in the following claims.

What is claimed is:

1. A system for monitoring an inflation status of a tire within a wheel assembly of a vehicle, the wheel assembly having a wheel, wheel base, wheel rim, and tire, the system comprising:
    a sensor mounted to the wheel rim and adapted to transmit a distance signal indicative of a measured distance from the wheel rim to an inside surface of the tire adjacent a riding surface;
    a control unit in communication with the sensor and adapted to receive the distance signal, wherein the control unit determines the inflation status of the tire and transmits an inflation status signal indicative of the inflation status; and
    an indicator located within a passenger compartment of the vehicle and in communication with the control unit to receive the inflation status signal, wherein the indicator presents the inflation status of the tire.

2. The system of claim 1, wherein the sensor includes a controller for pre-processing the distance signal.

3. The system of claim 1, wherein the inflation status is one of normal inflation, under inflation, and over inflation.

4. The system of claim 1, further comprising:
    a vehicle parameter sensor for measuring a vehicle parameter, wherein the vehicle parameter sensor is in communication with the control unit.

5. The system of claim 4, wherein the control unit derives the inflation status as a function of the measured distance and the vehicle parameter.

6. The system of claim 5, wherein the vehicle parameter is one or more of air temperature within the tire, velocity of the vehicle, and load of the vehicle.

7. The system of claim 1, wherein the sensor is a proximity sensor.

8. The system of claim 7, wherein the proximity sensor is an optical sensor.

9. The system of claim 7, wherein the proximity sensor is an ultrasonic sensor.

10. The system of claim 1, wherein the distance signal is an ultrasonic signal.

11. The system of claim 1, wherein the indicator is a visual device for transmitting visual signals.

12. The system of claim 11, wherein the visual indicator is located on a rear view mirror of the vehicle.

13. The system of claim 1, wherein the control unit is integrated with a control unit concurrently used for controlling an anti-lock braking system of the vehicle.

14. A method for monitoring an inflation status of a tire within a wheel assembly of a vehicle, the wheel assembly having a wheel, wheel base, wheel rim, and tire, the method comprising:
    transmitting a distance signal indicative of a distance from the wheel rim to an inside surface of the tire adjacent a ridding surface;
    determining the inflation status of the tire;
    communicating an inflation status signal indicative of the inflation status; and
    presenting the inflation status of the tire within a passenger compartment of the vehicle.

15. The method of claim 14, wherein the inflation status is one of normal inflation, under inflation, and over inflatlon.

16. The method of claim 147 further comprising:
    transmitting a vehicle parameter signal indicative of a measured vehicle parameter, wherein the inflation status is determined as a function of the distance and the vehicle parameter.

17. The method of claim 16, wherein the vehicle parameter is one or more of air temperature, velocity of the vehicle, and load of the vehicle.

* * * * *

UNITED STATES PATENT AND TRADEMARK OFFICE
CERTIFICATE OF CORRECTION

PATENT NO. : 6,778,075 B2
DATED : August 17, 2004
INVENTOR(S) : Philip Mark Headley et al.

It is certified that error appears in the above-identified patent and that said Letters Patent is hereby corrected as shown below:

Column 6,
Line 36, before "surface;" delete "ridding" and substitute -- riding -- in its place.
Line 44, delete "claim 147" and substitute -- claim 14 -- in its place.

Signed and Sealed this

Ninth Day of November, 2004

JON W. DUDAS
*Director of the United States Patent and Trademark Office*